United States Patent
Bennis et al.

(10) Patent No.: US 7,617,083 B2
(45) Date of Patent: Nov. 10, 2009

(54) METHOD FOR SIMULATING FLUID FLOWS WITHIN A RESERVOIR BY MEANS OF A CHIMERA TYPE DISCRETIZATION

(75) Inventors: Chakib Bennis, Rueil Malmaison (FR); Isabelle Faille, Carrieres sur Seine (FR); Lionel Ladouari, Paris (FR); Roland Masson, Paris (FR); Bertrand Moraisin, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 395 days.

(21) Appl. No.: 11/444,474

(22) Filed: Jun. 1, 2006

(65) Prior Publication Data

US 2006/0277013 A1    Dec. 7, 2006

(30) Foreign Application Priority Data

Jun. 2, 2005    (FR)    ................... 05 05680

(51) Int. Cl.
*G06F 7/60*     (2006.01)
*G06G 7/50*     (2006.01)
*G06G 7/48*     (2006.01)
*G01V 1/40*     (2006.01)
*G01F 1/00*     (2006.01)
*G01F 17/00*    (2006.01)

(52) U.S. Cl. ............... 703/10; 703/2; 703/9; 702/6; 702/9; 702/12; 702/45; 702/50; 367/72; 395/500

(58) Field of Classification Search ............. 703/2, 703/9, 10; 702/6, 9, 12, 45, 50; 367/72; 395/500

See application file for complete search history.

(56) References Cited

U.S. PATENT DOCUMENTS

| | | | | |
|---|---|---|---|---|
| 5,710,726 | A | * | 1/1998 | Rowney et al. ............... 703/10 |
| 6,018,497 | A | * | 1/2000 | Gunasekera ................. 367/72 |
| 7,369,973 | B2 | * | 5/2008 | Kennon et al. ................. 703/2 |

OTHER PUBLICATIONS

Baysal et al. "An Overlapped Grid Method for Multi-Grid Finite Volume/Difference Flow Solvers-MaGGie"" Feb. 1990.*
Espedal et al. "Domain Decomposition Methods for Flow in Heterogeneous Porous Media": Contemporary Mathematics vol. 218, 1998.*

(Continued)

*Primary Examiner*—Kamini S Shah
*Assistant Examiner*—Shambhavi Patel
(74) *Attorney, Agent, or Firm*—Antonelli, Terry, Stout & Kraus, LLP.

(57) ABSTRACT

A method for simulating flows in reservoirs, such as hydrocarbons, by means of chimera type grid which fluid generates a chimera grid made up of a set of elementary grids for accounting for characteristics of the flows and of the geometry (e.g., radial grid in the well zone and CPG grid for the reservoir) so that their union covers the entire simulation domain and that there is a minimum overlap between two neighboring elementary grids. Interpolation parameters allowing connection of the flows calculated on the grid to the flows calculated on the neighboring grids are then determined on the border of each elementary grid. Finally, flows are simulated within the reservoir and the well, and the variables describing the flow on the border of the overlap zones are interpolated using the interpolation parameters.

9 Claims, 4 Drawing Sheets

OTHER PUBLICATIONS

Giertsen et al. "Volume Visualization of Sparse Irregular Meshes" IEEE Computer Graphics and Applications 1992.*

Freitas et al. "SImulation of Fluid Structure Interactions Using Patched-Overset Grids" Journal of Fluids and Structures, Volumn 13, 1999.*

Nacul, Evandro Correa. Use of Domain Decomposition and Local Grid Refinement in Reservoir Simulation, 1991.*

Patrick Jenny, et al, "Modeling Flow in Geometrically Complex Reservoirs Using Hexahedral Multi-Block Grids", SPE Journal, vol. 7, No. 2, Jun. 2002, XP002364060, pp. 1-10.

Kao, Kai-Hsiung, et al: "Grid Adaptation Using Chimera Composite Overlapping Meshes", AIAA Journal, American Institute of Aeronautics and Astronautics, US, vol. 32, No. 5, May 1994, pp. 942-949, XP009054272, ISSN: 001-1452.

Djomehri, M. J. et al: "An Analysis of Performance Enhancement Techniques for Overset Grid Applications", Parallel and Distributed Processing Symposium, 2003. Proceedings. International Apr. 22-26, 2003, Piscataway, NJ, USA, IEEE Apr. 22, 2003, pp. 64-72, XP010645587, ISBN: 0-7695-1926-1.

* cited by examiner

METHOD FOR SIMULATING FLUID FLOWS WITHIN A RESERVOIR BY MEANS OF A CHIMERA TYPE DISCRETIZATION

BACKGROUND OF THE INVENTION

1. Field of the Invention

The present invention relates to a method for simulating fluid flows within a reservoir from methods referred to as chimera methods; which is an alternative solution for reservoir simulation, allowing accounting for the radial directions of flow around wells and thus improving the calculation accuracy. Furthermore, this modular approach allows testing in an efficient and interactive way several development scenarios during modelling.

2. Description of the Prior Art

An oil reservoir is a porous and permeable subsoil formation associated with an impermeable cover that traps hydrocarbons. The order of magnitude of the lateral extension of a reservoir is one kilometer whereas the depth thereof is rather about ten meters. It is crossed by a variable number of geometric discontinuities such as wells or faults.

In oil exploration, survey of an oil reservoir requires simulation of the fluid flows within the reservoir and of the geometric discontinuities running therethrough in order to define the economic interest and the production modes of the field. These simulations are referred to as "reservoir simulations".

It is therefore necessary to simulate fluid flows over the entire domain covered by the reservoir, by taking into account all the geometric discontinuities running therethrough. The simulation domain is then defined as the set of the reservoir and the geometric discontinuities. This simulation requires, on the one hand, physical modelling of the flows by a set of equations referred to as flow model and, on the other hand, discretization of these equations to solve the problem in an approximate way. The simulation domain is represented by means of a grid allowing discretization of the domain in space, thus allowing solution of the discrete equations and to provide an approximation of the physical solution. Simulation of fluid flows within a reservoir therefore requires two stages:

discretizing the structure of the domain by means of a grid, and discretizing the flow equations according to the grid selected.

Grid generation is a crucial element for new-generation oil reservoir simulators. A grid allows description of the geometry of the geologic structure studied by means of a representation in discrete elements wherein the simulation is carried out. Better understanding of the physical phenomena involved requires 3D simulation of the multiphase flows in increasingly complex geologic structures, in the neighborhood of different types of singularities such as stratifications, faults, onlaps, channels and complex wells. All this complexity has to be taken into account first by the grid that has to reproduce as accurately as possible the geologic information in its heterogeneous character. Furthermore, good apprehension of the physical phenomena occurring in these complex structures requires a hierarchical and modular grid approach.

The following documents mentioned in the course of the description hereafter illustrate the state of the art:

Alexander S. Williamson and John E. Chappelear, "Representing Wells in Numerical Reservoir Simulation: Part 1 Theory", SPE 7697, 1981

Sophie Balaven-Clermidy, "*Génération de Maillages Hybrides Pour la Modélsation de Réservoirs Pétroliers*", Thèse de doctorat, IFP, Ecole des mines de Paris, 2001.

Chesshire et Henshaw, "*Composite Overlapping Meshes for the Solution of Partial Differential Equations*", Journal of Computational Physics 90, 1-64, 1990.

Shih, "*Overset grids: Fundamentals and Practical Issues*", AIAA Applied Aerodynamics Conference. 3259, 2002.

Lin, C. W., Smith, G. D., and Fisher, S. C.—Application of a Multiblock Grid Generation Approach to Ship Configuration, 3rd International Conference on Numerical Grid Generation in CFD, Spain, June 1991.

Wells are generally thin tubes having a radius of about ten centimeters and comprising several perforations (at the most permeable points). Scale problems in reservoir modelling are therefore flagrant: the reservoir/well flow models can therefore only be coupled models. This scale difference also has to be taken into account if the discontinuity is a fault, which is why it is crucial to obtain a fine description of the flows around the discontinuities.

There are several known approaches based on the use of a complete grid representing all of the simulation domain (reservoir+discontinuities). A commonly used method consists in gridding the reservoir part of the domain in a single block (several in case of faults) and to integrate the presence of other discontinuities such as wells in the equations. The presence of wells is considered as a source term defined by means of a productivity index Ip. This method is for example described in the document by Williamson (1981).

However, the necessity for a finer description of the flows around discontinuities such as wells leads to the elaboration of a modular approach where the various objects (reservoir and well for example) considered can be taken into account individually. Flow modelling around wells for example is carried out by means of the "well models". These models allow simulation of multiphase flows in the well drainage area by adopting a small-scale description of the characteristics of the porous medium in the area around the well where the flows are fast.

Thus, in a more recent method developed by the assignee, the reservoir, in the area close to the discontinuity are gridded and the two grids are combined by creating a transition zone. The result is referred to as hybrid grid, as described in the document by S. Balaven-Clermidy (2001).

This method requires a considerable effort for generating the grid of the transition zone notably in three dimensions.

An alternative to this approach is the use of multi-block grids wherein the calculation domain is represented by a set of subdomains, gridded independently of one another. They can overlap one another or not. There are for example multi-block grids with non-coincident overlaps referred to as "chimera grids" or "Composite Overlapping Meshes". This type of grid is described for example by Chesshire and Henshaw (1990). These chimera grids have been used for about ten years in the field of aeronautics (Shih, 2002) and hydrodynamics (Lin, Smith, G. D., and Fisher (1991) for complex geometries and in particular those with mobile bodies (missiles, helicopter blades, fluid structure coupling, . . . ). This type of grid allows adequate description of the flows on the border of discontinuities, but control of the subdomains regarding flows requires particular methods called chimera methods. However, the current chimera grid creation techniques and the associated chimera methods are not applied for reservoir simulation.

SUMMARY OF THE INVENTION

The method according to the invention allows simulation of fluid flows within the reservoir and its geometric discontinuities by modelling the structure of the domain by means of a chimera grid and by adjusting the fluid flow model to this grid by means of appropriate chimera methods.

The invention relates to a method for simulating fluid flow parameters within a heterogeneous medium forming a first subdomain crossed by at least one geometric discontinuity forming a second subdomain. The method comprises the following stages:

generating a chimera grid to construct a discretized representation of the subdomains, by forming at least a first grid for gridding the first subdomain and by forming at least a second grid for gridding the second subdomain, the two grids having at least one overlap zone;

determining interpolation parameters to estimate flow parameters in overlap zone while imposing continuity of the flow parameters between each subdomain; and simulating the flow parameters by solving the equations of at least one flow model in the subdomains and by interpolating the flow parameters at the level of the overlap zone using the interpolation parameters.

According to the method, generation of the chimera grid can comprise the following stages:

defining for the first subdomain an interpolation method allowing estimation of fluid flow parameters for each cell of the first grid included in the overlap zone;

defining an overlap parameter defining the size of the overlap zone determining a limit boundary in accordance with the interpolation method and the overlap parameter; and determining the cells of the first grid to be interpolated according to the limit boundary, by selecting the cells all the points to be interpolated of which are located within the limit boundary.

Generation of the chimera grid can also comprise the following stages:

determining and deactivating cells, among the cells of the first grid to be interpolated, that will not be used a priori to interpolate flow parameters for cells of the second grid, by selecting neighboring cells which are to be interpolated;

defining for the second subdomain an interpolation method allowing estimation of fluid flow parameters for each cell of the second grid included in the overlap zone;

checking that all the cells of the second grid to be interpolated are interpolable and adding the deactivated cells required for these interpolations.

The interpolation methods can be selected from among at least one of the following methods:

interpolation of the flow parameters at the center of the cells interpolation of the flow parameters at the center of the faces of the cells; and interpolation of the flows on the faces of the cells.

If the geometric discontinuity is a well, the second grid can be a radial grid generated from at least one of the following geometric methods:

a geometric method based on the initial and the final radius, the number of cells along r and the desired geometric progression q;

a geometric method based on the initial and the final radius, the number of cells along r and the length of the border cells along r;

an automatic method locally based on the average length of the cell edges of the first grid.

Cells necessary for interpolation of the flow parameters at the level of the overlap zones can be determined by determining the convex envelope of cell centers containing a given point and by determining a cell containing the given point. The convex envelope can be determined by means of bucket sorting of the cell centers, and a cell containing the given point can be determined by means of a virtual grid.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION OF THE INVENTION

According to the invention, the method for simulating fluid flows within a reservoir can be broken up into three main stages:

1. Construction of a chimera grid representing the simulation domain, that is the set of the reservoir subdomain and of the subdomain of the discontinuities running through the reservoir;

2. Definition of interpolation formulas at the level of the overlap zone to provide continuity of the solution on the borders of the subdomains 3. Simulation of the fluid flows within the simulation domain.

To simplify the description, the discontinuities are assumed to be wells, which allows to illustrate radial flows being taken into account, without limiting the invention to this type of discontinuity.

1. Construction of a Chimera Grid Representing the Simulation Domain

A chimera grid is a multi-block grid with overlap. These grids are a set of elementary grids covering the domain being studied, having as only constraints a minimum overlap and similar cell sizes in the overlap zones. The main asset of this type of grid lies in the flexibility and the modularity of the definition of the grid, of the models and of the numerical methods of each block. On the other hand, they allow using structured elementary grids and therefore fast solvers in the blocks, and they are therefore suited for parallel calculation.

According to the invention, construction of a chimera grid can be broken up into three stages:

Construction of a grid representing the reservoir;

Construction of grids representing the wells that cross the reservoir;

Definition of the overlap zone for the reservoir and well grids.

1.1 Construction of a Grid Representing the Reservoir

The reservoir can be discretized by regular Cartesian grids (identical discretization intervals in all the directions), irregular Cartesian grids (elongate in a direction) or Corner-Point geometry (CPG) grids:

A Cartesian grid is a grid whose vertices are of the form $(x_i, y_j, z_k)$ with i, j and k natural numbers. A Cartesian grid can be generated by discretizing each direction of the bounding box identically or not according to the type of Cartesian grid required (regular or irregular).

A CPG grid can be defined starting from 12 curves defining each an edge of the grid. Discretization of each one of the curves then gives the desired grid. Such grids are for example described in French Patent 2,747,490 and corresponding U.S. Pat. No. 5,844,564 filed by the assignee.

The reservoir grid is thus defined by:
its bounding box, that is a Cartesian volume,
its discretization intervals in each direction.

Figure 1:
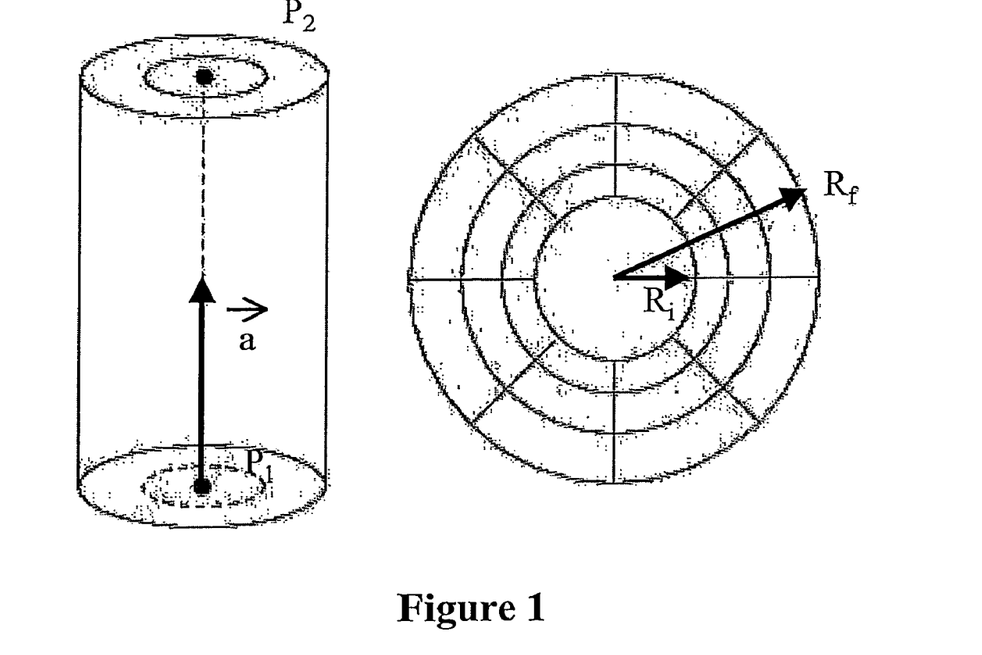
FIG. 1 shows a radial grid.

1.2 Construction of Grids Representing the Wells Running Through the Reservoir The wells can be discretized by a circular radial type structured grid allowing the drainage area of the wells to be modelled. FIG. 1 illustrates a radial grid. Such a grid is defined by:
the well trajectory (at least two points $P_1$ and $P_2$ defining an axis $\vec{a}$),
the initial ($R_i$) and the final ($R_f$) radius.

A cell can then be defined by (FIG. 2):
the minimum and maximum radius of this cell r1 and r2,
the minimum and maximum angle of this cell θ1 and θ2.

A point in this grid is then determined by its polar coordinates r and θ (FIG. 2):
r: distance to the axis of the well (in relation to the origin O),
θ: rotation around the axis of the well.

In order to better meet the requirements of the simulation according to the invention, three radial grid generation methods are presented:

1. A geometric method based on the initial and the final radius, the number of cells along r and the desired geometric progression q.
2. A geometric method also based on the initial and the final radius, the number cells along r and the length of the border cells along r (initial value of the geometric sequence).
3. An automatic method based on the initial and the final radius.

With Geometric Progression

The first method is the simplest one since it is based on the definition of the geometric sequence only.

With an initial radius $R_i$ and a final radius $R_f$, we can find a geometric sequence of fixed common ratio q passing through n+1 points ($R_0 = R_i$ and $R_n = R_f$). Each point of this sequence is defined by:

$$R_k = R_i + h \cdot \frac{1-q^k}{1-q}$$

The length of the first cell (from $R_0$ to $R_1$), h, then just has to be determined as a function of the other parameters:

$$R_f = R_i + h \cdot \frac{1-q^n}{1-q} \Rightarrow h = \frac{(R_f - R_i) \cdot (1-q)}{1-q^n}$$

It is now possible to evaluate the first formula for k=0 ... n to know the radius of each discretization level of the well.

With Geometric Progression and Fixed Cell Length

The second method is still based on geometric sequences, but this time the value of h is fixed from the start. This method can be useful if one wants to check that the border cells of the grid generated have a given length. The missing parameter in this case is the common ratio q, which verifies a polynomial equation of degree n to be solved as a function of the other parameters.

With Fixed Cell Length

The last method is no longer based on the definition of the geometric sequences. It is the most automatic method: the parameters are calculated from the cells of the reservoir grid.

Let H be the average length of the edges of a reservoir cell. One decides to fix this length H as the length of the outer edge of the well border cells. The goal is here to generate a radial grid whose border cells have a size that is more or less equivalent to that of the reservoir cells.

Figure 2:
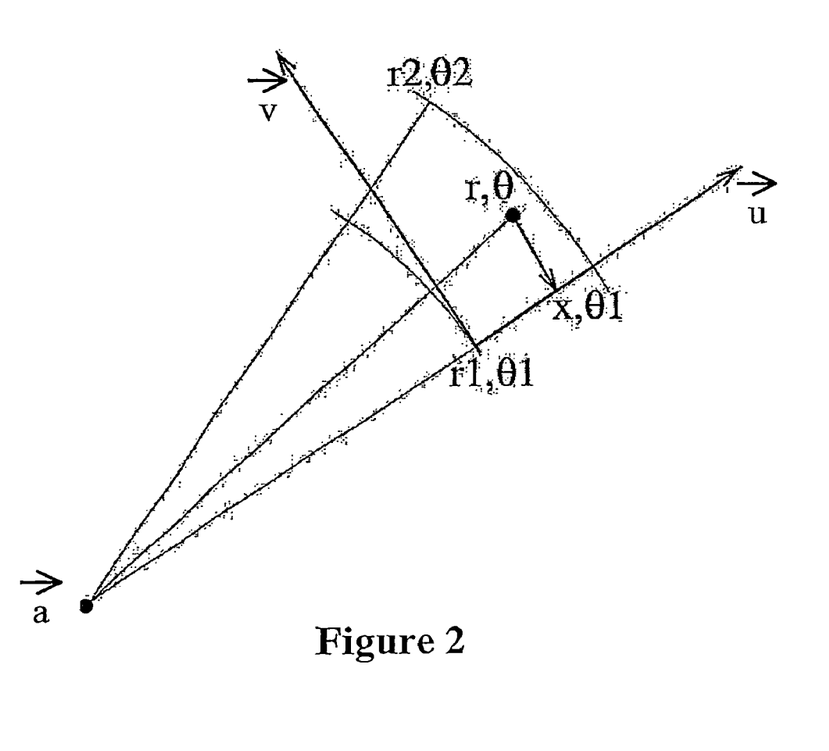
FIG. 2 illustrates the definition of a cell of a radial grid.

H being fixed, we determine the discretization interval $n_\theta$ of the well according to the angle of rotation θ around axis $\vec{a}$ of the well (see FIG. 2):

$$n_\theta = \frac{2\pi \cdot R_f}{H}$$

Since the discretization interval has to be whole, the integer is taken that is the closest to $n_\theta$, denoted by $\tilde{n}_\theta$, then define $\tilde{H}$ and $\tilde{h}$ can be defined, the lengths along r of the outer and inner border cells of the well:

$$\tilde{H} = \frac{2\pi \cdot R_f}{\tilde{n}_\theta}$$

and $$\tilde{h} = \frac{2\pi \cdot R_i}{\tilde{n}_\theta}$$

These two values represent the initial and the final value of the progression of the cells along r.

The next stage determines the number of cells to be inserted for these dimensions to be best respected (an approximation of the size of the reservoir cells is sought).

Let the geometric interpolation function β(s) defined by:

$$\beta(s) = \tilde{h} \cdot \left(\frac{\tilde{H}}{\tilde{h}}\right)^s$$

with s∈[0, 1]

The value of n is deduced:

$$n = \frac{d}{\tilde{h}} \cdot \left[\frac{\tilde{h} - \tilde{H}}{\tilde{H} \cdot \ln\left(\frac{\tilde{h}}{\tilde{H}}\right)}\right]$$

Here again, the integer is taken that is the closest to n, denoted by ñ, since the number of cells is determined to be inserted along the radius of the well.

Then, the position of each discretization point in relation to the initial and the final radius has to be determined.

Therefore n=N is fixed and solve the equation for t:

$$N \cdot \frac{n}{\tilde{n}} = d \cdot \int_0^t \frac{1}{\beta(s)} ds$$

for N=0 ... ñ, ñ being the integer that is the closest to n. Multiplication by n/ñ simply allows readjustment of the value of N as a function of the rounding performed on n.

The value found for t allows location of discretization point N along the radius, from $R_i$.

1.3 Definition of the Overlap Zone of the Chimera Grid

Definition of the overlap zone of a chimera grid from the reservoir and well grids essentially defines the cells for which no flow parameter simulation is necessary. After creating the reservoir grid and the radial grid, there are three types of cells in the chimera grid under creation:

the cells of the reservoir grid outside the overlap zone, the cells of the reservoir grid of the overlap zone (which require an interpolation), the cells of the well grid necessarily in the overlap zone (which require an interpolation).

Definition of the overlap zone comprises:

determining and marking the cells of the reservoir grid whose flow parameters have to be interpolated by means of the flow parameters of the cells of the well grid of the overlap zone; and determining and removing the cells of the reservoir grid for which no flow calculation will be carried out.

The chimera grid thus constructed therefore has four types of cells:

the cells of the reservoir grid outside the overlap zone, the cells of the reservoir grid of the overlap zone that have not been deactivated, the cells of the well grid of the overlap zone, and the cells of the well grid outside the overlap zone (that require no more interpolation).

The number of cells requiring calculation of the flow parameters or interpolation is reduced while still ensuring a fine description of the flow phenomena at the level of the discontinuities.

For clarity reasons, the method is first presented in two dimensions. The three-dimensional generalization will be described later.

Definition of the overlap zone comprises 4 main stages:

stage 1: definition of a limit circle centered on the axis of the well, stage 2: determination and marking, as a function of the limit circle, of the cells of the reservoir grid whose flow parameters will require interpolation, stage 3: determination and deactivation of the interpolable cells of the reservoir grid that will not be used a priori to interpolate flow parameters of cells of the well grid and for which no flow calculation will be carried out, stage 4: addition of some cells to the reservoir grid in order to guarantee interpolation on the radial (well) grid.

These various stages are described hereafter in detail:

Stage 1: Definition of a Limit Circle

Definition of the limit circle depends on two parameters:

a type of interpolation that it is desired to use on the subdomain of the reservoir, that is the type of interpolation used to define the flow parameters of the cells of the reservoir grid to be interpolated. Three types of interpolation can be considered: at the center of the cells, at the center of the cell faces and at the flows, an overlap parameter defining the size of the overlap. This parameter corresponds to the number of outer layers of the radial grid that are covered by the reservoir subdomain. This definition corresponds to a discrete overlap notion, that is corresponding to the grid.

Figure 3:
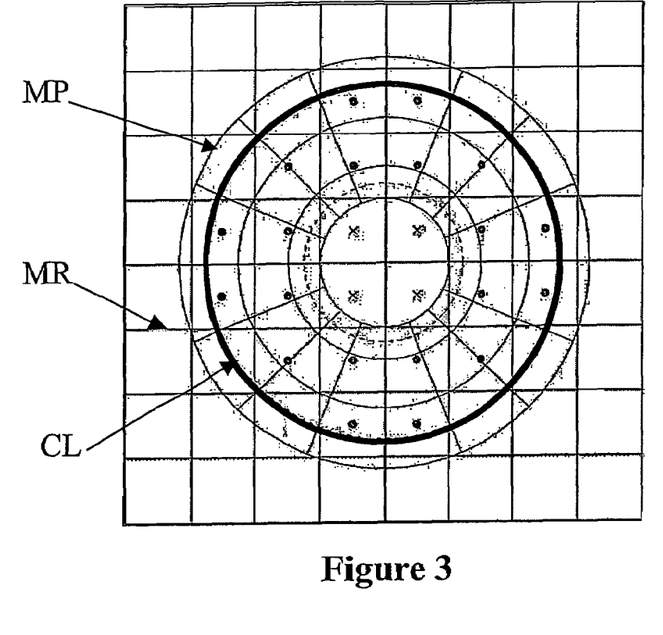
FIG. 3 illustrates the definition of a limit circle with an interpolation at the center of the cells.

The limit circle is defined as a function of the interpolation type as follows:

If, in the reservoir, interpolation is carried out with the first type of interpolation (at the center of the cells), the limit circle is the largest circle centered on the well containing cell centers of the radial grid (well grid). FIG. 3 illustrates this type of limit circle where MR represents the reservoir grid, MP the well grid and CL the limit circle. The points represent the border cells of the reservoir grid and the crosses represent the deactivated cells.

If, still in the reservoir, interpolation is carried out with the second type of interpolation (at the center of the faces), the limit circle is still the largest circle centered on the well, containing cell centers of the radial grid.

Finally, if interpolation of the reservoir is carried out at the flows, the limit circle is the largest circle centered on the well contained in the radial grid.

Then, this initial limit circle is redefined as a function of the second parameter, the overlap parameter. Definition of the overlap size of the chimera grid ensures that a certain number of layers of the radial grid are covered by the reservoir grid once the cells of the reservoir grid deactivated (stage 3). One therefore checks that a certain layer of the radial grid is interpolable by cells of the reservoir grid. A layer is referred to as interpolable if it comprises only interpolable cells. Thus, this layer and all the layers of greater radius are covered by reservoir cells. In fact, if a layer of the radial grid is covered by the reservoir grid, considering the geometry, it will also be the case for the layers whose radius is greater. Similarly, if a layer of the radial grid is interpolable, it is also the case for all the layers whose radius is greater.

Figure 4A:
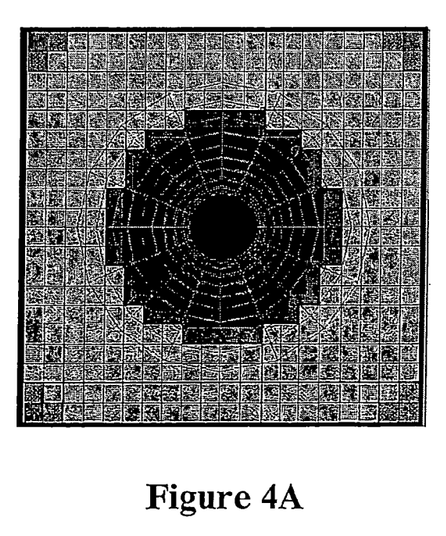
FIG. 4A illustrates part of a chimera grid with an overlap of 1.
Figure 4B:
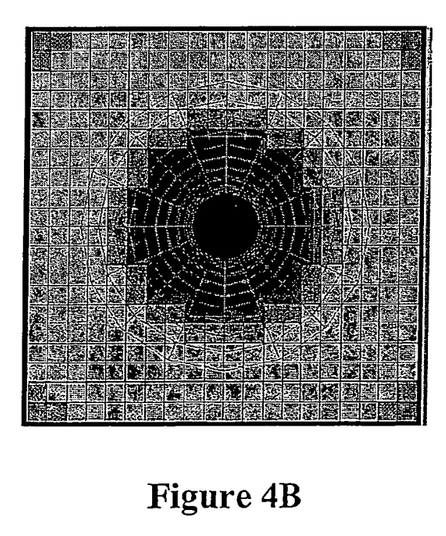
FIG. 4B illustrates part of a chimera grid with an overlap of 2.

For overlap of a single layer, one therefore takes the outer layer of the well, that is the layer corresponding to the initial limit circle as defined above (see FIG. 4A). On the other hand, for a greater overlap, one takes the layer such that the number of layers that are external thereto plus itself is equal to the desired overlap parameter, thus redefining the limit circle. In the example of FIG. 4B, the overlap is two.

It is thus possible to define, whatever the interpolation type, the "size" of the overlap which will be the number of circles beyond the initial limit circle.

Stage 2: Determination and Marking of the Interpolable Reservoir Grid Cells

The limit circle thus defined allows to identify the centers or the edges of the reservoir grid cells to be interpolated by well grid cells, as well as the centers or the edges of the cells in line with the axis of the well.

If, in the reservoir, interpolation is carried out with the first interpolation type (at the centre of the cells), the interpolable cells are the cells whose centers are within this limit circle.

If interpolation is carried out with the second interpolation type (at the center of the faces), the interpolable cells are the cells all the faces of which are interpolable, an interpolable face being a face whose center is within the limit circle.

Finally, if the reservoir is interpolated at the flows, an interpolable cell will be, as in the previous case, a cell all the faces of which are interpolable and therefore the middle of each edge of which is located within the limit circle.

All these interpolable reservoir grid cells are thus determined, then marked.

Stage 3: Rough Deactivation of Most of the Interpolable Cells

Most of the interpolable reservoir grid cells are roughly deactivated (a "hole" is made in the reservoir grid): in case of an interpolation at the center of the cells, all the cells adjacent to four interpolable cells (therefore all the interpolable cells, except those located the furthest from the center) are deactivated and, in case of an interpolation at the flows or at the center of the edges, they are all deactivated. The minimum number of active cells for which interpolation on the reservoir grid is possible is thus obtained. In fact, in the first case, the cells on the border of the reservoir subdomain are cells interpolable through the well and, in the second case, the border of the reservoir subdomain consists of faces interpolable through the well.

Stage 4: Addition of Cells for Interpolation on the Well Border

At this stage, interpolation on the well grid cannot be guaranteed. In fact, some reservoir grid cells necessary for interpolation of the radial grid cells may have been deactivated. In this case, the reservoir cells necessary for interpolation on the well grid are reactivated by scanning one by one the radial grid cells in contact with the reservoir grid cells (referred to as well border cells) and the reservoir grid cells necessary for interpolation are reactivated.

It is therefore necessary to know the type of interpolation to be carried out to define the flow parameters of the well grid cells to be interpolated. It can be noted that, on the one hand, the latter stage depends on the type of interpolation performed on the well grid and, on the other hand, that the interpolation type is not necessarily identical to the interpolation type used on the reservoir subdomain.

The main stages of the algorithm used to define the overlap zone of the chimera grid can then be described as follows:

stage 1: definition of a limit circle, from the interpolation type to be used on the reservoir subdomain and an overlap parameter, stage 2: determination and marking of the cells all the points of which to be interpolated (centers or edge centers) are located within the limit circle, stage 3: determination and deactivation of the cells all the neighboring cells of which are interpolable (necessary for the well grid to be taken into account), and stage 4: checking that all the border cells of the well are interpolable and adding the deactivated reservoir grid cells necessary for these interpolations.

1.4 Methods of Detecting Interpolative Cells in 2D

The grid thus defined therefore is overlap zone of a set of reservoir cells to be interpolated and a set of well cells to be interpolated. The interpolable cells have been clearly identified at this stage. It is then necessary to define the methods allowing determination of the interpolative cells, that is the cells that will be used to interpolate the interpolable cells. In particular, the methods used to:

find the cells whose convex envelope of the centers contains a given point, know in which cell a given point is located have to be described.

To determine the convex envelope of cell centers containing a given point, the vertex that is the closest to the point in question has to be sought. Once this vertex found, the cells sharing this vertex just have to be scanned to recover the centers whose convex envelope contains the given point.

To find the closest vertex, the cell barycentre that is the closest to the point first has to be sought. The method can therefore use an efficient sorting technique referred to as bucket sorting. The vertex that is the closest among the 4 vertices (8 in 3D) is then determined.

To determine which cell contains a given point, the barycenter that is the closest to this point is first sought. Once the barycenter obtained, a virtual grid of the cell found, based on triangles, is created. These triangles have the barycenter and two vertices neighboring the cell as the vertices.

If a grid is not regular, it is possible to rapidly advance from cell to cell until the cell containing the point is found. In fact, the barycenter that is the closest to the point may not be that of the cell containing the point.

In this case, the list of the triangles of the virtual grid just has to be properly organized so as to know, when leaving a given triangle, towards which neighboring cell one is heading (top, bottom, left or right in 2D). For example, the triangles can be stored in this order. When leaving the cell through the last triangle, the cell located to the right of the current cell therefore has to be analyzed.

In order to know if a point is in a given triangle, its position in relation to each side of the triangle just has to be tested using the equations of the lines passing through these sides.

Creation of a virtual grid is very simple. The triangles just have to be created, for any cell, in the same order, for example top, bottom, left, right. The main thing is to know, for a given triangle, towards which neighboring cell one is heading.

1.5 Extension to 2.5D

To carry out extension of the method to a 2.5D case, a Cartesian reservoir grid and a radial well grid is considered. The discretization interval of these two grids along z is the same. The ends of the well grid correspond to the limits of the reservoir grid. The method described above can then be applied to the upper face of the two grids (2D case) and the result is extended to the whole. In this case, an eliminated cell becomes a whole column of eliminated cells.

It is also possible to project the initial 2D result onto a surface of the form $z=f(x,y)$ instead of remaining in a plane. This projection is then repeated along axis z to obtain another 2.5D grid type.

1.6 Generalization to 3D

The definition of the overlap zone of the chimera grid according to the invention can be directly extended to 3D, the limit circle becoming then a limit boundary (sphere, ellipsoid, ...). However, it is necessary to add a hemisphere to each end of the well so as to model the flows correctly, the latter being no longer radial but spherical at the ends of the well.

The method provided can therefore give correct results, whether the well is vertical or inclined in a Cartesian or CPG reservoir.

Detection of the interpolative cells in 2D can be directly extended to 3D.

In case if interpolation at the center of the cells or at the center of the faces, the eight cells the convex envelope of the centers of which contains the point to be interpolated have to be determined. These are, as in 2D, cells sharing the vertex that is the closest to the point.

As for interpolation at the flows, the cell containing the point to be interpolated just has to be determined. The method is the same, but the virtual grid of the cell then is made of tetrahedrons.

To define the tetrahedrons of the virtual grid, each face is divided into two triangles. Each face being defined by four vertices, the diagonal is taken passing through the vertex having the smallest index. Thus, the triangles are defined independently of the cells to which they may belong.

We can then define twelve tetrahedrons having the center of the cell as the vertex and a triangle of a face as the base. The tetrahedrons are then stored in a precise order allowing to know, when leaving one of the tetrahedrons, in which neighboring cell to carry out the new tests (same principle as in two dimensions). The same method as in 2D is used to know if a point is in a tetrahedron.

Figure 5:
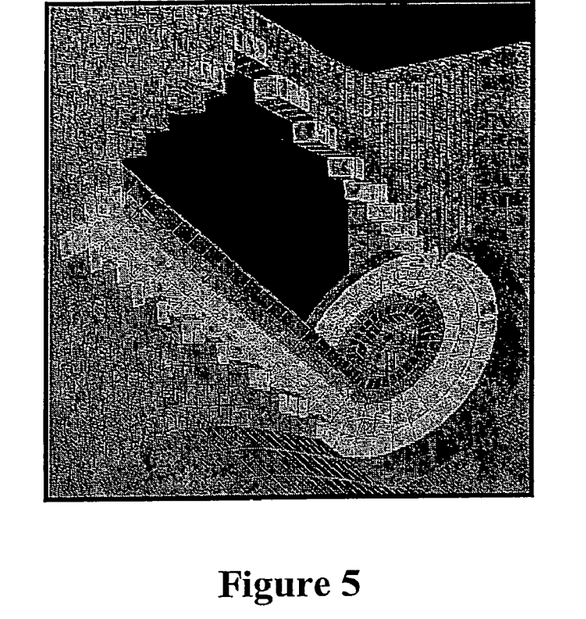
FIG. 5 shows an example of a 3D chimera grid constructed according to the method wherein an inclined well is integrated in a CPG grid.

An example of a 3D chimera grid constructed according to the method is illustrated by FIG. 5, wherein an inclined well is integrated in a CPG grid.

2. Definition of Interpolation Formulas for the Overlap Zone

The main asset of chimera grids lies in the flexibility and the modularity of the definition of the grid, the models and the numerical methods of each subdomain. Besides, they allow to use structured elementary grids and therefore fast solvers in the subdomains, and they are naturally suited to parallel calculation. On the other hand, they require, in the overlap zone, the definition of points and of interpolation formulas for information transfer between the grids.

The continuous problem is written as follows:
find a solution to the equations of flow in the reservoir,
find a solution to the equations of flow in the well, and
find these solutions in such a way that these solutions and their derivatives link up continuously.

When discretizing, that is once the chimera grid is constructed, what is provided:
a system of equations for the reservoir (one equation per cell of the reservoir grid),
a system of equations for the well (one equation per cell of the well grid),
linking conditions which, in the chimera case, are interpolation formulas connecting unknowns of a grid to the unknowns of the other. These formulas are referred to as chimera methods.

Methods referred to as chimera methods (methods of modelling from a chimera grid) aim to solve partial derivative equations on subdomains whose grids overlap but are independent. In particular, no vertex, no cell center and no edge is common to the two grids, and edge conditions (flows or values at the points) have to be defined to solve the equations in each subdomain. Interpolation formulas are therefore selected to set the system.

It is crucial to find good interpolation formulas since the good behavior of the numerical scheme will depend on the validity thereof. This definition is essential for keeping the order of approximation of the schemes used in each subdomain. One of the goals is also to keep certain properties of the conventional schemes such as the stability (solution that remains bounded throughout the simulation time) and, in some cases, the conservativity (conservation of the mass of hydrocarbons in the reservoir) of the numerical schemes obtained on the elementary grids. The subdomain grids being made in such a way that solution of the problem is very efficient, the quality loss of the scheme (flow consistency, scheme stability and mass conservativity) will be directly linked with a defective interpolation method.

Three methods were retained, the first two methods for Dirichlet conditions (value of the solution imposed on the border) and the last one for Neuman conditions (flow value imposed on the border).

The interpolation formulas for the flow parameters on a subdomain are linear combinations of the flow parameters of the other subdomain. In general terms, these formulas allow interpolation of a value at the level of a point referred to as "point to be interpolated" which represents, for example, the center of a cell of one of the grids, from points referred to as "interpolative points" which represent, for example, the centers of cells of the other grid.

Interpolation at the Center of a Cell

In this case, what is referred to as the "point to be interpolated" is the center of a cell of one of the grids, and the "interpolative points" are the centers of cells of the other grid, used for interpolating the point to be interpolated.

The value at the center of a cell is interpolated by the values of the four cell centers whose convex envelope contains the point to be interpolated (8 centres in 3D).

Calculation of the interpolation coefficients is described below for interpolation within the reservoir grid, then within the well grid.

At the reservoir level: let A, B, C, D, E, F, G and H be the interpolative points and P the point to be interpolated. ABCDEFGH is assumed to be rectangular. We want $\lambda_A, \lambda_B, \lambda_C, \lambda_D, \lambda_E, \lambda_F, \lambda_G$, and $\lambda_H$ to be such that:

$$u_P = \lambda_A u_A + \lambda_B u_B + \lambda_C u_C + \lambda_D u_D + \lambda_E u_E + \lambda_F u_F + \lambda_G u_G + \lambda_H u_H$$

with u the value to be interpolated (typically a pressure).

The following is set:

$$\vec{u} = \overrightarrow{AB}, \vec{v} = \overrightarrow{AF} \text{ and } \vec{w} = \overrightarrow{AD}$$

$$\hat{x} = \frac{\det(\overrightarrow{AP}, \vec{v}, \vec{w})}{\det(\vec{u}, \vec{v}, \vec{w})},$$

$$\hat{y} = \frac{\det(\vec{u}, \overrightarrow{AP}, \vec{w})}{\det(\vec{u}, \vec{v}, \vec{w})}$$

and $$\hat{z} = \frac{\det(\vec{u}, \vec{v}, \overrightarrow{AP})}{\det(\vec{u}, \vec{v}, \vec{w})}$$

Here, the determinants 3×3 represent the volumes of the parallelepipeds constructed on the three vectors. We thus calculate the quotient of the volume corresponding to P in each direction on the total volume of the cell.

Thereafter the interpolation coefficients are defined as follows:

$$\lambda_A = (1-\hat{x})(1-\hat{y})(1-\hat{z}) \quad \lambda_B = \hat{x}(1-\hat{y})(1-\hat{z})$$
$$\lambda_C = \hat{x}(1-\hat{y})\hat{z} \quad \lambda_D = (1-\hat{x})(1-\hat{y})\hat{z}$$
$$\lambda_E = \hat{x}\hat{y}(1-\hat{z}) \quad \lambda_F = (1-\hat{x})\hat{y}(1-\hat{z})$$
$$\lambda_G = (1-\hat{x})\hat{y}\hat{z} \quad \lambda_H = \hat{x}\hat{y}\hat{z}$$

At the well level: considering the radial grid used, it is necessary to work in polar coordinates. For each point, it is necessary to determine r which is the distance thereof to the axis of the well, and θ which is the rotation around the axis of the well (see FIG. 2).

To find r, the distance is determined between the point and the axis of the well by projecting this point onto the axis. If the point is in a cap (intersection between a ball and a half space) at one end of the well, we take the distance to the vertex of the corresponding axis.

To determine θ, a local reference mark is used at the cell containing the point, as illustrated by FIG. 2. By projecting the point of coordinates (r, θ) onto axis $\vec{u}$, we find point O, then abscissa x. Angle θ is deduced as follows:

$$\theta = \theta_1 + \arccos\left(\frac{x}{r}\right)$$

$\theta_1$ being known upon creation of the cells because the values of θ for each vertex of the well are stored when initializing the well.

The formulas used are then the same as in the Cartesian case of the reservoir.

Figure 6:
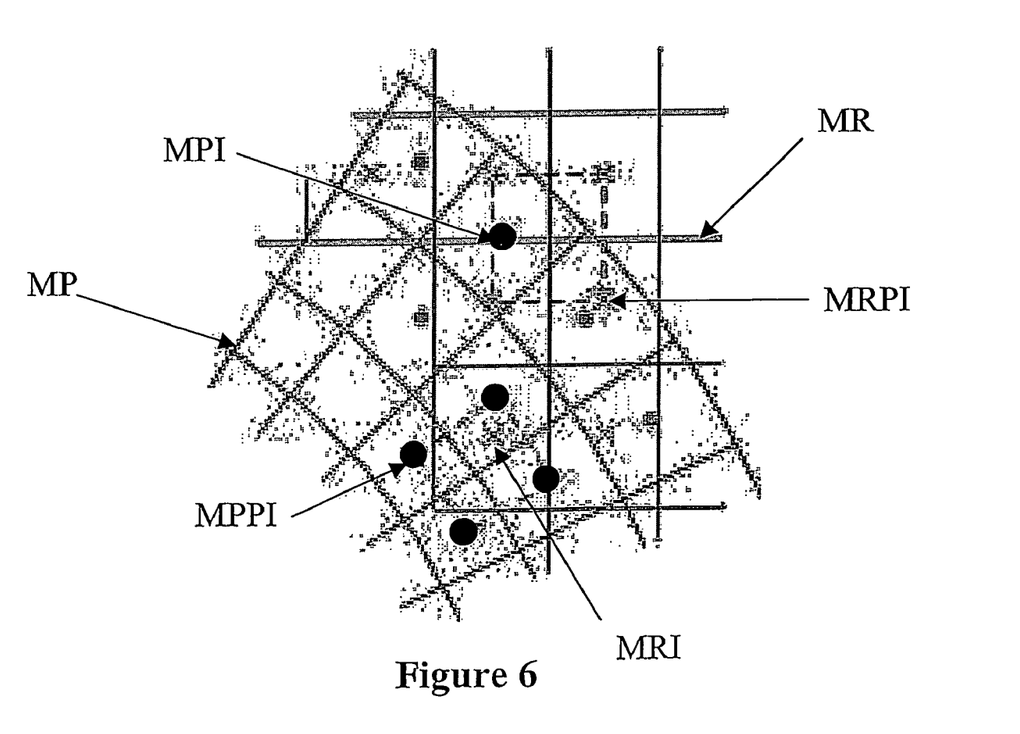
FIG. 6 illustrates the interpolation method at the center of a cell.

FIG. 6 illustrates this type of interpolation for the reservoir and for the well, with:

MR: reservoir grid,
MP: well grid,
MRI: interpolated reservoir grid cell,
MPI: interpolated well grid cell,
MRPI: reservoir grid cells used for interpolation of MPI, and
MPPI: well grid cells used for interpolation of MRI.

Interpolation of the Unknown at the Center of an Edge

In this case, what is referred to as "point to be interpolated" is the center of the edge of a cell of one of the grids, and "interpolative points" are the centers of the cells of the other grid used for interpolating the point to be interpolated.

This interpolation is very similar to the previous one: the value of the unknown is interpolated with the same formulas, but this time at the center of the edge. Consequently, the following equation is also written in the border cells:

$$u_p = \lambda_A u_A + \lambda_B u_B + \lambda_C u_C + \lambda_D u_D + \lambda_E u_E + \lambda_F u_F + \lambda_G u_G + \lambda_H u_H$$

But, in this case, P is the center of a border edge and the Dirichlet conditions are applied thereto (value of the solution assumed on the border of the subdomain), which concretely amounts to introducing a border unknown ($u_p$) and an equation (the previous equation) in the system of equations to be solved to find the approximate solution.

The value at the center of an edge is interpolated by the values of the four cell centres whose convex envelope contains the point to be interpolated (8 centres in 3D), and calculation of the interpolation coefficients is identical to that carried out in the case of interpolation at the cell centers.

Figure 7:
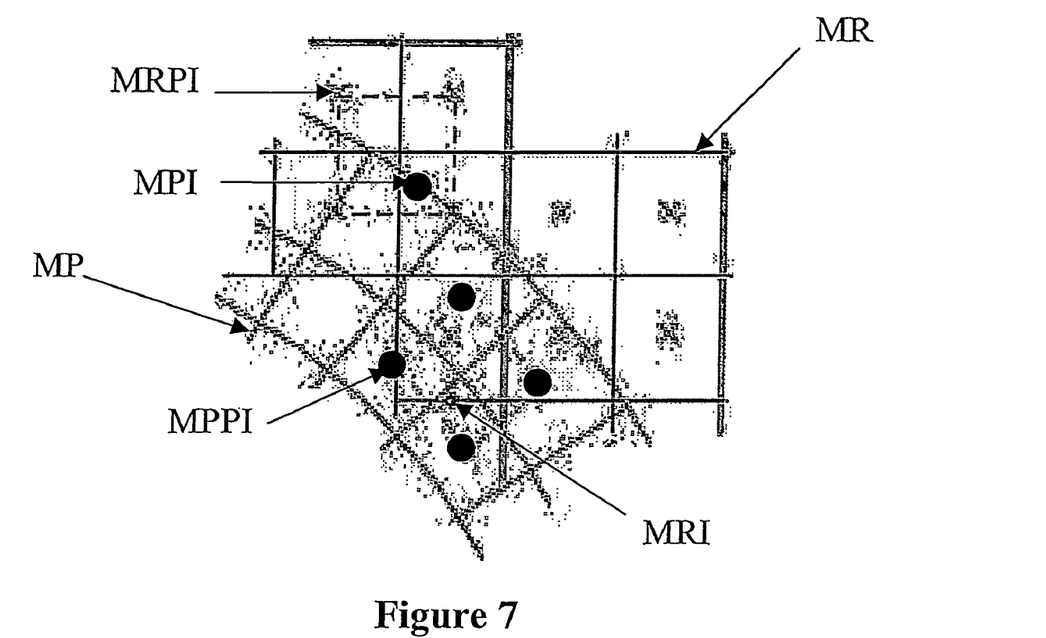
FIG. 7 illustrates the interpolation method at the center of an edge.

FIG. 7 illustrates this type of interpolation for the reservoir and the well, with the same notations as in FIG. 6.

Flow Interpolation at the Centre of an Edge

In this case, what is referred to as "point to be interpolated" is the center of an edge of a cell of one of the grids, and the "interpolative points" are the centers of the edges of the cell of the other grid used for interpolating the point to be interpolated.

The flow is here to be directly interpolated on the border of the subdomains. This interpolation is performed in the middle of the edge by a formula of mixed finite elements. The difference is that the latter no longer depends on the value of the unknowns at the centre of the neighbouring cells, but on the value of the flow at the edges of the interpolative cell.

To calculate interpolation coefficients $\alpha_i$, it is desired to find here the flow on a face as a function of the flows of the faces of the interpolative cell:

$$F_P = \sum_{i=1}^{6} \alpha_i F_i$$

It is then set:

$$\alpha_i = \frac{A}{A_i} \vec{v_i} \cdot \vec{n}$$

where A is the surface area of the face to be interpolated, Ai the surface area of the interpolative face i, $\vec{n}$ the normal external to the face to be interpolated and $\vec{v_i}$ a base function defined on the interpolative cell as follows:

$$\vec{v_0} = -(1-\hat{x}) \cdot \vec{u} \quad \vec{v_3} = \hat{x} \cdot \vec{u}$$
$$\vec{v_1} = -(1-\hat{y}) \cdot \vec{v} \quad \vec{v_4} = \hat{y} \cdot \vec{v}$$
$$\vec{v_2} = -(1-\hat{z}) \cdot \vec{w} \quad \vec{v_5} = \hat{z} \cdot \vec{w}$$

Vectors $\vec{u}$, $\vec{v}$, $\vec{w}$ and values $\hat{x}$, $\hat{y}$, $\hat{z}$ are the same as in the other two interpolation types.

By defining the $\vec{v_i}$ this way, we ensure continuity of the flows from one cell to the next because the flow on a face does not depend on the other faces. This can be simply explained by the fact that:

$$\vec{v_i} \cdot \vec{n_j} = \delta_{ij} = 0 \text{ if } i \neq j$$

hence:

$$\text{Flow}(\vec{v_i} \text{ on face } j) = \int_{\delta_j} \vec{v_i} \cdot \vec{n_j} dS = 0 \text{ if } i \neq j$$

If, for example, the flow of face 0 as a function of faces 0, 1, 2, 3, 4 and 5 is evaluated, $F_0$ is found because only $\vec{v_0} \cdot \vec{n_0}$ will be non-zero.

Figure 8:
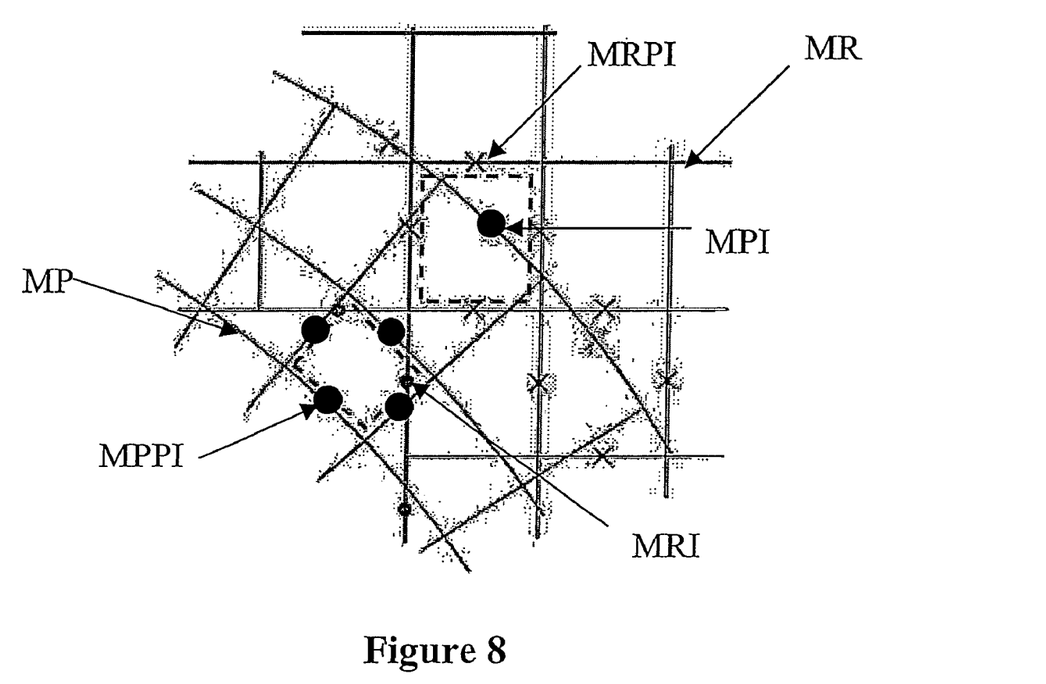
FIG. 8 illustrates the flow interpolation method at the center of an edge.

FIG. 8 illustrates this type of interpolation for the reservoir and the well, with the same notations as in FIGS. 6 and 7.

3. Simulation of Fluid Flows within the Simulation Domain

Simulation of the fluid flows assigns to each cell of the previously constructed chimera grid flow parameter values by defining a numerical scheme and by determining the interpolations inherent in the chimera nature of the grid.

The physical model used for modelling fluid flows in the reservoir and in the radial zone around the well can be a compressible and non-compositional two-phase model well known to the man skilled in the art and described for example in the following document:

Peter Bastian, "*Numerical Computation of Multiphase Flows in Porous media*", Habilitationsschrift, Technische Fakultät, Christian-Albrechts-Universität Kiel, 1999.

The numerical scheme used to model these equations can be an upstream off-centered finite-volume type scheme known to the man skilled in the art and described for example in the following document:

Thierry Gallouët, Raphaëlle Herbin and Robert Eymard, "*The Finite Volume Methods*", in Philippe Ciarlet and J-L Lions, editors, Handbook of Numerical analysis, pages 713-1020, North Holland, 2000.

The physical model used for modelling fluid flows within the well can be taken into account as an edge condition (imposed pressure or flow).

As for the overlap zone, the interpolation formulas are used from the selected chimera methods described above.

The invention claimed is:

1. A method for simulating fluid flow parameters within a heterogeneous underground medium having a first subdomain, crossed by at least one geological discontinuity having a second subdomain with the domains representing the underground medium, comprising:

generating a chimera grid including cells constructing a discretized structural representation of the subdomains, by forming at least a first grid gridding the first subdomain and by forming at least a second grid gridding the second subdomain, the two grids having at least one overlap zone;

providing for the first subdomain an interpolation method for estimating fluid flow parameters for each cell of the first grid included in the overlap zone;

providing an overlap parameter defining a size of the at least one overlap zone;

providing a limit boundary in accordance with the interpolation method and the overlap parameter;

identifying cells of the first grid to be interpolated according to the limit boundary, by selecting cells of all points to be interpolated which are located within the limit boundary;

identifying interpolation parameters for estimating flow parameters in the cells to be interpolated while imposing continuity of flow parameters between each subdomain; and simulating the flow parameters by solving equations of at least one flow model in the subdomains and by interpolating the flow parameters at a level of the at least one overlap zone using the interpolation parameters.

2. A method as claimed in claim 1, wherein generation of the chimera grid comprises:

determining and deactivating cells, among cells of the first grid to be interpolated, that are not to be used a priori to interpolate flow parameters of cells of the second grid, by selecting neighboring cells which are to be interpolated;

defining for the second subdomain an interpolation method allowing estimation of fluid flow parameters for each cell of the second grid included in the at least one overlap zone; and determining that all the cells of the second grid to be interpolated are interpolable and adding deactivated cells required for interpolations of all of the cells of the second grid to be interpolated.

3. A method as claimed in claim 1, wherein the interpolation methods are selected from among at least one of the following methods:

interpolation of flow parameters at a center of the cells;

interpolation of the flow parameters at a center of faces of the cells; and interpolation of flows on the faces of the cells.

4. A method as claimed in claim 1 wherein, the geometric discontinuity is a well, and the second grid is a radial grid.

5. A method as claimed in claim 4, wherein the radial grid is generated from at least one of the following geometric methods:

a geometric method based on an initial and a final radius, a number of cells along radius r and a desired geometric progression;

a geometric method based on the initial and the final radius, a number of cells along r and a length of the border cells along r; and an automatic method locally based on an average length of cell edges of the first grid.

6. A method as claimed in claim 1, wherein cells required for interpolation of flow parameters at a level of the at least one overlap zones are determined by providing a convex envelope of cell centers containing a given point and by identifying a cell containing the given point.

7. A method as claimed in claim 6, wherein the convex envelope of cell centers containing the given point are determined by locating a vertex that is closest to the given point bucket sorting of vertices of the convex envelope closest to the point.

8. A method as claimed in claim 6, wherein a cell containing the given point is determined with a virtual grid.

9. A method as claimed in claim 2, wherein the interpolation method is selected from among at least one of the following methods:

interpolation of the flow parameters at a center of the cells;

interpolation of the flow parameters at a center of faces of the cells; and interpolation of the flows on the faces of the cells.

* * * * *